United States Patent [19]
Hirose

[11] Patent Number: 5,339,749
[45] Date of Patent: Aug. 23, 1994

[54] TABLE POSITIONING MECHANISM
[75] Inventor: Kazuya Hirose, Tokyo, Japan
[73] Assignee: Hihasuto Seiko Co., Ltd., Kawagoe, Japan
[21] Appl. No.: 902,938
[22] Filed: Jun. 23, 1992
[51] Int. Cl.$^5$ ............................................. A47B 11/00
[52] U.S. Cl. .................... 108/143; 108/145; 108/137; 254/126
[58] Field of Search ................ 108/145, 137, 143, 20, 108/138, 141, 9, 10; 248/421; 254/122, 126, 9 C

[56]  References Cited
U.S. PATENT DOCUMENTS

| | | | |
|---|---|---|---|
| 2,554,494 | 5/1951 | Hodgin | 254/122 |
| 2,587,094 | 2/1952 | Berg et al. | 254/126 X |
| 3,712,488 | 1/1973 | Steves | 254/126 X |
| 3,928,946 | 12/1975 | Wynn | 254/126 X |
| 4,180,252 | 12/1979 | Cushenbery | 254/126 X |
| 4,405,116 | 9/1983 | Eisenberg | 254/122 |

Primary Examiner—Jose V. Chen
Attorney, Agent, or Firm—Vincent Kohli; Thomas R. Morrison

[57] ABSTRACT

First and second sliding bodies are guided along a first axis on linear guide rails. A linkage connects a table to the first and second sliding bodies. The linkage moves the table parallel to the linear guide rails when the first and second sliding bodies are displaced the same distance. The linkage moves the table perpendicular to the linear guide rails when one of the sliding bodies is moved a different distance from the first sliding body. The perpendicular distance can be either the Z axis or the Y axis.

5 Claims, 3 Drawing Sheets

TABLE POSITIONING MECHANISM

BACKGROUND OF THE INVENTION

The present invention relates to a table positioning mechanism. More particularly, the invention relates to a table positioning mechanism designed for applications in precision measurement instruments, precision processing machines, general industrial machines, industrial robots, or similar applications.

In the prior art, table positions in equipment such as general industrial machines have been fixed by mechanisms employing a pair of single axis positioners, each positioner having a pair of linear guide rails and a driving mechanism for producing motion in the direction of the given axis.

The position of a table may be fixed on orthogonal coordinates by using a mechanism wherein each of the positioners is place orthogonally with respect to the other. Such a mechanism, however, has drawbacks in that it occupies a large space and requires the use of numerous elements, thus making it expensive to produce.

OBJECT AND SUMMARY OF THE INVENTION

It is an object of the invention to provide a table positioning mechanism that requires less space than the mechanisms described in the above stated prior art, and that is less expensive to produce because it requires fewer elements.

Briefly stated, the present invention provides a table positioning device in which first and second sliding bodies are guided along a first axis on linear guide rails. A linkage connects a table to the first and second sliding bodies. The linkage moves the table parallel to the linear guide rails when the first and second sliding bodies are displaced the same distance. The linkage moves the table perpendicular to the linear guide rails when one of the sliding bodies is moved a different distance from the first sliding body. The perpendicular distance can be either the Z axis or the Y axis.

According to an embodiment of the invention, there is provided a table positioning device comprising, a support base, first and second linear guide rails on the support base, a first sliding body and a second sliding body on the first and second linear guide rails, means for moving the first sliding body and the second sliding body respectively on a first axis parallel to the linear guide rails, the means for moving including first means for moving the first and second sliding bodies together and second means moving the first sliding body a different distance than the second sliding body, linkage means connecting the table to the first and second sliding bodies, and the linkage means including means, responsive to the different distance, for moving the table relative along a second axis normal to the first axis.

According to a feature of the invention, there is provided mechanism for positioning a table comprising: a first sliding body and a second sliding body, a linear guide means for guiding the first sliding body and the second sliding body along a common path, and a linkage means, the linkage means including means for moving the table parallel to the linear guide means when the first and second sliding bodies are moved in unison, and the linkage means further including means for moving the table in a direction normal to the linear guide means when the first and second sliding bodies are moved different distances.

The invention provides for a linkage, one embodiment of which includes parallel links, and a second link. The parallel links pivotally connect one sliding body to the table and the single link pivotally connects the other sliding block to the table such that the table may be positioned in a plane parallel to the common path of the linear guide means by moving the sliding bodies relative to each other and in unison.

Additionally, the invention may include a drive mechanism means, of which one embodiment comprises a screw shaft rotatably fixed on the support base parallel to the linear guide rails. A female screw body is threaded on the screw shaft, the female screw body being attached under one of the first sliding body and the second sliding body. A driving motor, functionally connected to the screw shaft for the purpose of rotating the screw shaft, thus imparts linear movement upon the female screw body attached to one of the sliding bodies when actuated.

A flexible cable for controlling the motors is not required because in the present invention the motors remain in a fixed position relative to the support base. Furthermore, since the motors are located at only on side of the mechanism, access to all other sides remains unimpeded.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
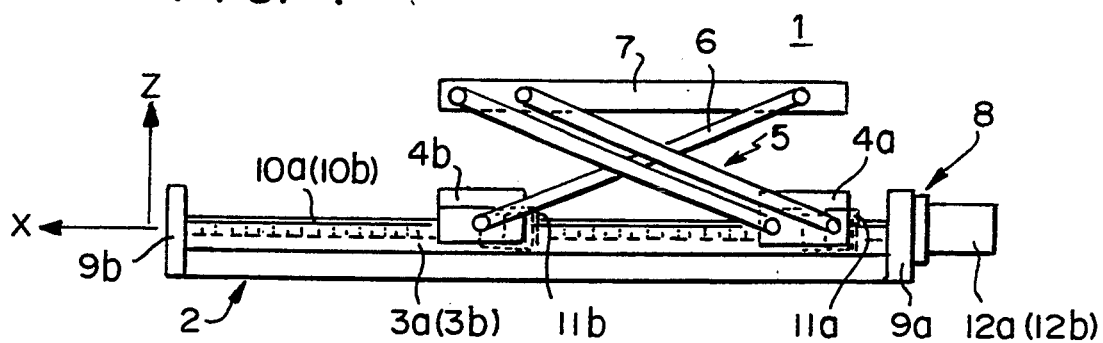
Fig. 1 is a side view schematic of an example of a table positioning mechanism of the present invention.

The following text presents a detailed example of a table positioning mechanism embodiment of the present invention referencing the accompanying drawings. Referring to FIG. 1, a table positioning mechanism, shown generally at 1, includes linear guide rails 3a and 3b fixed on a support base 2, forming a linear guide means. A first sliding body 4a and a second sliding body 4b slide on linear guide rails 3a and 3b. A first set of ends of parallel links 5 are pivotally attached to the first sliding body 4a. A first end of a link 6 is pivotally attached to the second sliding body 4b. A second set of ends of the parallel links 5, and the second end of the link 6 are pivotally attach to a table 7, such that they cross over each other.

Figure 2:
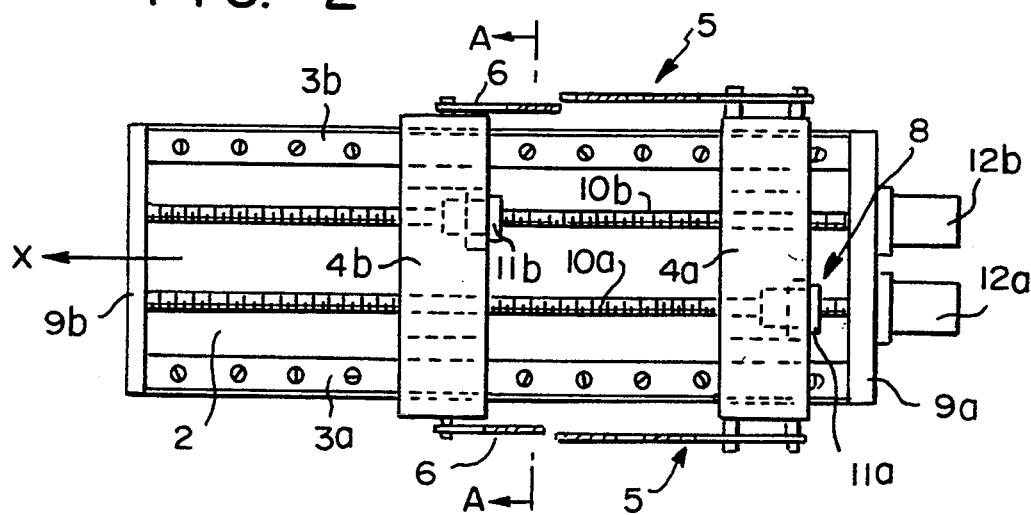
Fig. 2 is a top view schematic of the table positioning mechanism of FIG. 1.

Referring now to FIG. 2, table positioning mechanism 1 has a driving mechanism 8 which includes screw shafts 10a and 10b. Screw shafts 10a and 10b which are rotatably mounted parallel to linear guide rails 3a and 3b between support bodies 9a and 9b. Female screw bodies 11a and 11b are threaded to move forward and back on the screw shafts 10a and 10b, respectively, by driving motors 12a and 12b functionally coupled to the ends of the screw shafts 10a and 10b. The female screw bodies 11a and 11b are attached to the first sliding body 4a and the second sliding body 4b, respectively.

Figure 3:
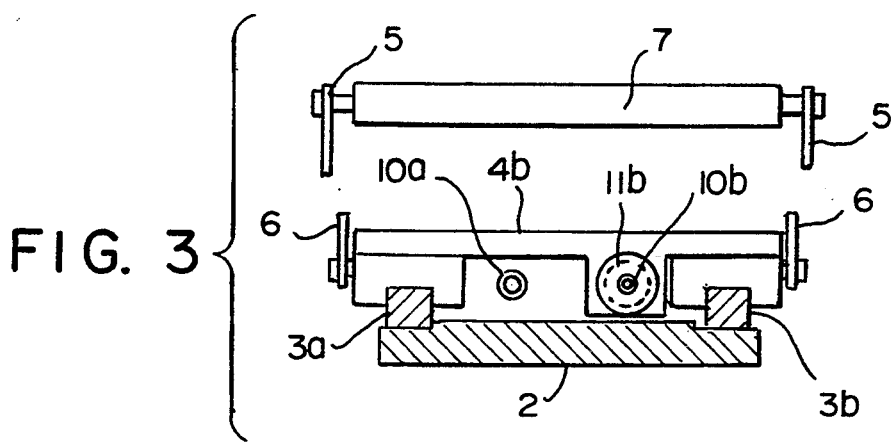
Fig. 3 is a sectional view taken along A—A in FIG. 1.

Referring now to FIG. 3, the female screw body 11b is attached under the second sliding body 4b, and the second sliding body rides upon the linear guide rails 3a and 3b. Female screw body 11a is similarly attached under the first sliding body 4a. Therefore further description of the arrangement of female screw body 11a is omitted.

Figure 4:
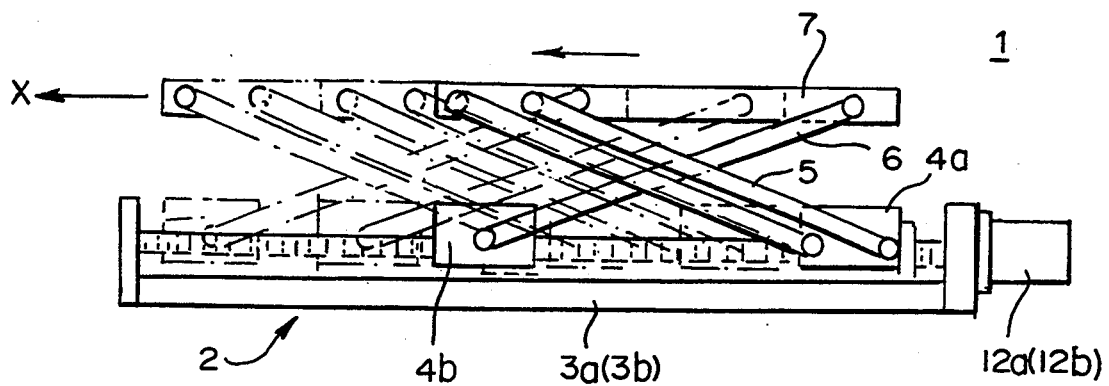
Fig. 4 and FIG. 5 are sequenced views of a table positioning mechanism of the present invention.

Referring to FIG. 4, driving motors 12a and 12b rotate screw shafts 10a and 10b, either in the same direction, or in opposite directions. When screw shafts 10a and 10b rotate in the same direction, female screw bodies 11a and 11b thus move forward and back to move the first sliding body 4a and the second sliding body 4b on the screw shafts 10a and 10b. When the above screw shafts 10a and 10b are rotated in the same direction, the first sliding body 4a and the second sliding body 4b are moved in unison on the linear guide rails 3a and 3b to any desired position along the X axis to position table 7 correspondingly along the X axis.

Figure 5:
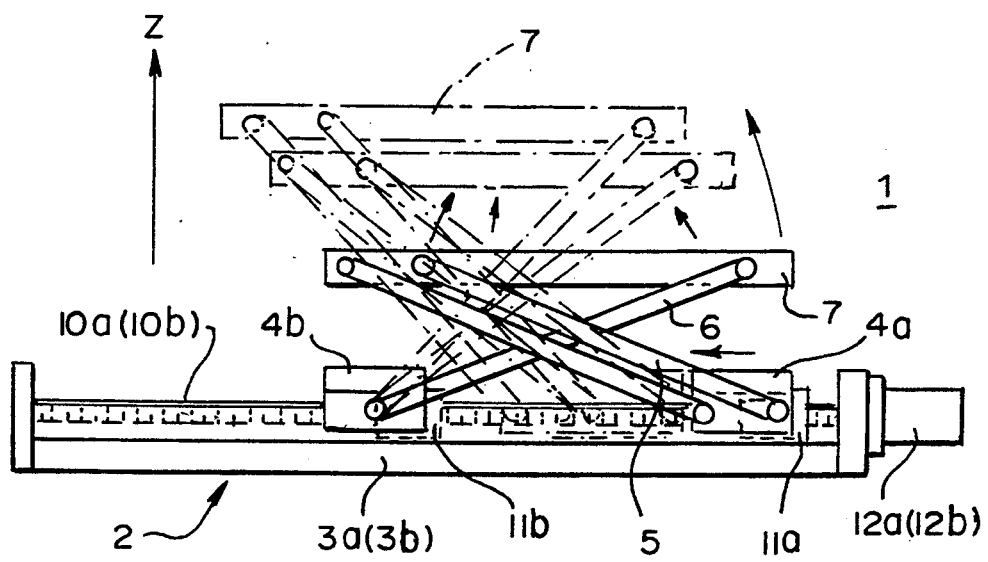

Referring now to FIG. 5, by rotating one of driving motors 12a and 12b in one direction, while holding the other driving motor stopped, the relative position between the first sliding body 4a and the second sliding body 4b is changed, whereby the position of the parallel links 5 and the link 6 are displaced so that the table 7 moves up and down along the Z axis perpendicular to the X axis direction of the linear guide rails 3a and 3b. Accordingly, it is possible to fix the vertical position of the table 7 in the Z axis.

Figure 6:
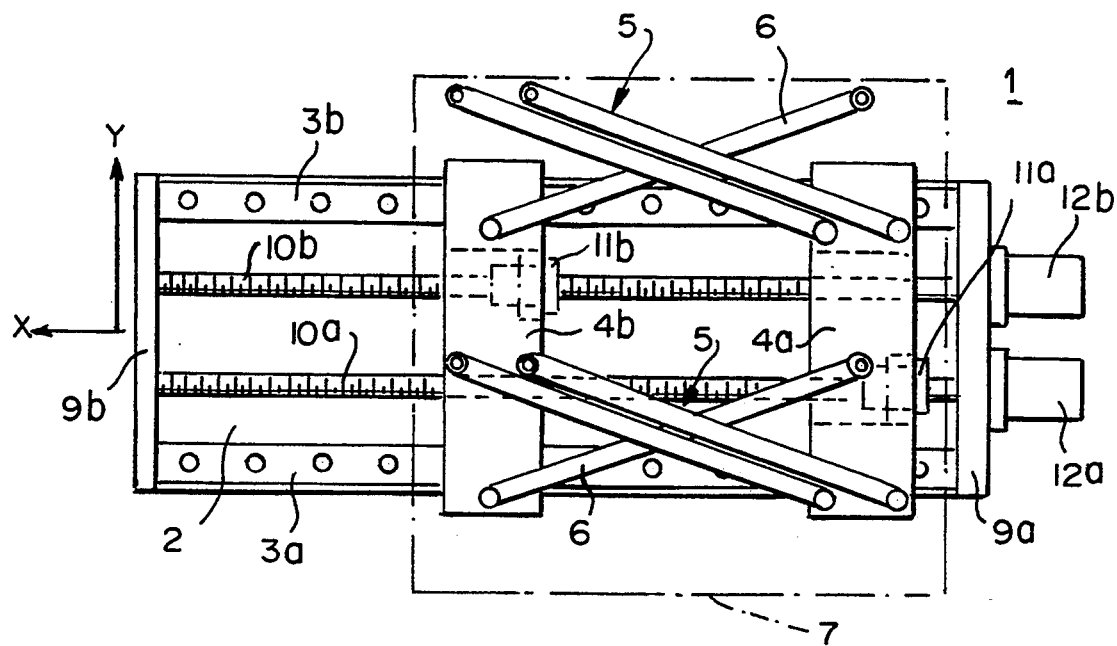
Fig. 6 is a top view schematic of another example of a table positioning mechanism of the present invention.
Figure 7:
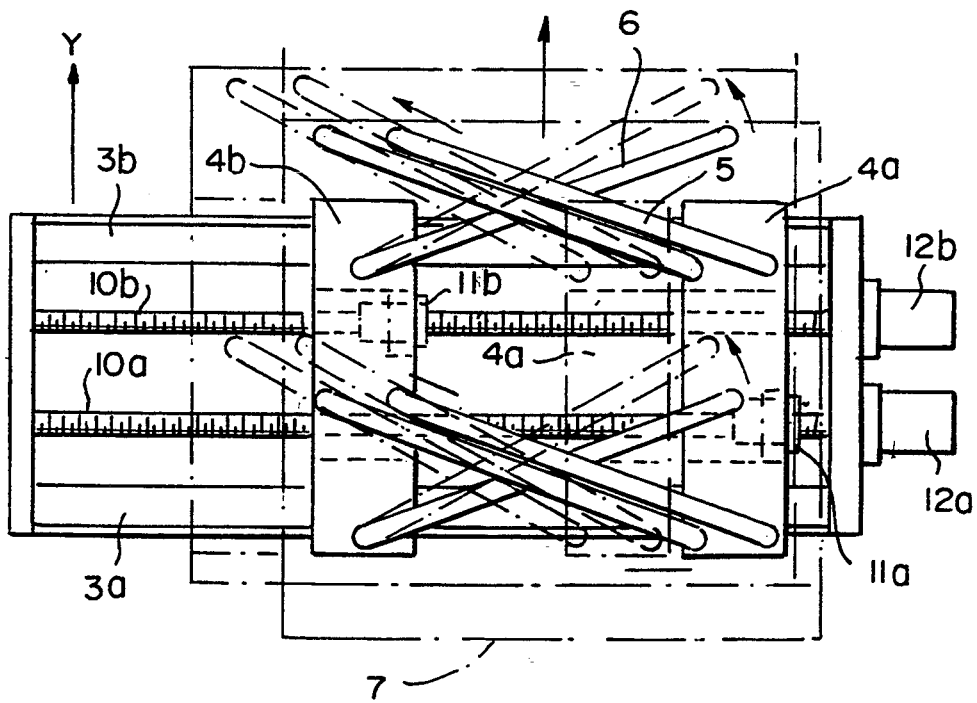
Fig. 7 is a sequenced view of a table positioning mechanism as shown in FIG. 6.

Referring now to FIG. 6, an embodiment of the invention is shown in which the parallel links 5 and the link 6 are attached to the first sliding body 4a and the second sliding body 4b so as to pivot in a plane parallel to the plane of the table 7 and the linear guide rails 3a and 3b. This arrangement makes it possible for differences in the rotation of driving motors 10a and 10b to move the table 7 horizontally in the Y axis.

Accordingly, in the present invention, the movement of the first sliding body 4a and the second sliding body 4b is controlled in a single axis, the axis of the linear guide rails 3a and 3b, however, it is possible to position the table 7 along two axis, one of which is that of the guide rails and the other is an axis that is perpendicular to the axis of the linear guide rails 3a and 3b, either along the Z axis normal to the plane of the table 7, or along the Y axis parallel to the plane of the table.

Since the linear guide rails 3a and 3b extend in only one of the two possible axis of operation, and since the positions of the driving motors 12a and 12b are fixed in the direction of the one axis, the table positioning mechanism occupies a small space.

Moreover, since the table 7 is moved indirectly by the parallel links 5 and link 6 in the direction of the Y axis or Z axis, perpendicular to the axis of the linear guided rails, it is not necessary to have an independent driving mechanism oriented in that direction. The structure of this mechanism thus becomes simple.

In the above embodiment of the table positioning mechanism of the present invention, it is possible to utilize a linear driving motor in the driving mechanism. When a linear driving motor is used, space for the driving motors 12a and 12b is not needed. Therefore, it is possible to further reduce the space requirements of the mechanism and to achieve additional space savings over the prior art.

The prior art has a single axis positioning mechanism in each of two directions, each of which require two parallel linear supports and a driving mechanism. While in the prior art the single axis positioning mechanisms are placed perpendicular to each other, in the present invention, the position of the driving mechanism is fixed in a single direction since the moving of the first sliding body and the second sliding body in the single direction allows the table to be positioned in two directions. Therefore, space savings are realized over the prior art configuration.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A table positioning device comprising;
   a support base;
   first and second linear guide rails on said support base;
   a first sliding body and a second sliding body on said first and second linear guide rails;
   means for moving said first sliding body and said second sliding body respectively on a first axis parallel to said linear guide rails;
   said means for moving including first means for moving said first and second sliding bodies together and second means moving said first sliding body a different distance than said second sliding body;
   linkage means connecting said table to said first and second sliding bodies;
   said linkage means including means, responsive to said different distance, for moving said table relative along a second axis normal to said first axis;
   said means for moving including a first screw shaft, a first female screw body, and a first driving motor;
   said first screw shaft rotatably fixed on said support base parallel to said linear guide rails;
   said first female screw body threaded on said first screw shaft;
   said first female screw body being attached to said first sliding body;
   said first driving motor connected to said first screw shaft for rotating said first screw shaft;
   said means for moving further including a second screw shaft, a second female screw body, and a second driving motor;
   said second screw shaft on said support base parallel to said linear guide rails;
   said second female screw body threaded on said second screw shaft;
   said second female screw body being attached to said second sliding body;
   said second driving motor connected to said second screw shaft for rotating said second screw shaft; and
   said first and second motors being independently driven, whereby said first and second sliding bodies are positionable together and also said different distances.

2. A mechanism according to claim 1, wherein said linkage means includes:

parallel links having a first set of ends pivotally connected to one of said first sliding body and said second sliding body, and said parallel links having a second set of ends pivotally connected to said table; and a link having a first end pivotally connected to another one of said first sliding body and said second sliding body, and said link having a second end pivotally connected to said table.

3. A table positioning device comprising;

a support base;

first and second linear guide rails on said support base;

a first sliding body and a second sliding body on said first and second linear guide rails;

means for moving said first sliding body and said second sliding body respectively on a first axis parallel to said linear guide rails;

said means for moving including first means for moving said first and second sliding bodies together and second means moving said first sliding body a different distance than said second sliding body;

linkage means connecting said table to said first and second sliding bodies;

said linkage means including means, responsive to said different distance, for moving said table relative along a second axis normal to said first axis;

said linkage means including parallel links having a first set of ends pivotally connected to one of said first sliding body and said second sliding body, and said parallel links having a second set of ends pivotally connected under said table; and said linkage means further including a link having a first end pivotally connected to another one of said first sliding body and said second sliding body, and said link having a second end pivotally connected under said table.

4. A mechanism for positioning a table comprising:

a first sliding body and a second sliding body;

a linear guide means for guiding said first sliding body and said second sliding body along a common path; and a linkage means;

said linkage means including means for moving said table parallel to said linear guide means when said first and second sliding bodies are moved in unison;

said linkage means further including means for moving said table in a direction normal to said linear guide means when said first and second sliding bodies are moved different distances;

means for selectively moving said first sliding body and said second body in unison and through said different distance.

said linkage means including parallel links having a first set of ends pivotally connected to said first sliding body;

a second set of ends on said parallel links pivotally connected under said table; and said linkage means including a link having a first end pivotally connected to said second sliding body, and said link having a second end pivotally connected under said table.

5. A mechanism according claim 4 wherein said means for selectively moving includes:

a screw shaft rotatably fixed on a support base parallel to said common path of said sliding bodies;

a female screw body threaded on said screw shaft, said female screw body being attached under one of said first sliding body and said second sliding body; and a driving motor connected to said screw shaft for rotating said screw shaft.

* * * * *